(12) United States Patent
Miyahara et al.

(10) Patent No.: US 8,381,788 B2
(45) Date of Patent: Feb. 26, 2013

(54) DEVICE AND METHOD FOR MANUFACTURING SHEET WITH CORDS

(75) Inventors: Hiroshi Miyahara, Hiroshima (JP); Jiro Agawa, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 377 days.

(21) Appl. No.: 12/672,699

(22) PCT Filed: Feb. 29, 2008

(86) PCT No.: PCT/JP2008/053654
§ 371 (c)(1),
(2), (4) Date: Feb. 9, 2010

(87) PCT Pub. No.: WO2009/069319
PCT Pub. Date: Jun. 4, 2009

(65) Prior Publication Data
US 2011/0192538 A1   Aug. 11, 2011

(30) Foreign Application Priority Data
Nov. 30, 2007   (JP) ................. 2007-310832

(51) Int. Cl.
*G03D 15/04* (2006.01)
(52) U.S. Cl. .............. 156/507; 156/406.4; 156/512
(58) Field of Classification Search ........... 156/130.7, 156/134, 304.1, 405.1, 406.4, 516, 519, 124, 156/264, 266, 397, 507, 512; 198/462.1, 198/462.2
See application file for complete search history.

(56) References Cited

U.S. PATENT DOCUMENTS 4,455,189 A   6/1984   Takasuga
6,471,044 B1 * 10/2002 Isaacs et al. ............... 198/809

FOREIGN PATENT DOCUMENTS

| DE | 2713895 | * | 10/1977 |
|---|---|---|---|
| DE | 19707367 | * | 6/1998 |
| DE | 202005011692 | U1 | 10/2005 |
| EP | 1325802 | A1 | 7/2003 |
| JP | 46-18611 | | 5/1971 |
| JP | 59-11236 | * | 1/1984 |
| JP | 59-011236 | A | 1/1984 |
| JP | 62-105626 | A | 5/1987 |
| JP | 04-305440 | A | 10/1992 |
| JP | 2923066 | B2 | 4/1999 |
| WO | 2006061024 | A1 | 6/2006 |

OTHER PUBLICATIONS

Machine generated English translation for DE 2713895.*
Machine generated English translation for DE 19707367.*
European Search Report for EP 08721074.6, issued Jun. 1, 2011.
International Search Report of Application No. PCT/JP2008/053654 mailed May 20, 2008.

* cited by examiner

*Primary Examiner* — Richard Crispino
*Assistant Examiner* — Martin Rogers
(74) *Attorney, Agent, or Firm* — Kanesaka Berner & Partners, LLP

(57) ABSTRACT

To provide a plurality of conveyor belts which are disposed, with a space kept mutually in the width direction orthogonal to the longitudinal direction thereof, and capable of running along the longitudinal direction thereof in such a state that the sheet pieces with cords are placed thereon, and a lift mechanism installed between the plurality of conveyor belts to support the sheet pieces with cords on the upstream side or those on the downstream side in the longitudinal direction among the sheet pieces with cords placed on the conveyor belts while in contact with these sheet pieces from the lower side, thereby allowing them to make a relative upward movement from the sheet placing surfaces of the conveyor belts.

1 Claim, 7 Drawing Sheets

US 8,381,788 B2

DEVICE AND METHOD FOR MANUFACTURING SHEET WITH CORDS

TECHNICAL FIELD

The present invention relates to the manufacture of rubber tires and, more particularly, to a device and a method for manufacturing a sheet with cords capable of improving workability on joining sheet pieces with cords which are raw material members of a band-like rubber tire.

Priority is claimed on Japanese Patent Application No. 2007-310832 filed on Nov. 30, 2007, the content of which is incorporated herein by reference.

BACKGROUND ART OF THE INVENTION

In a step of manufacturing a band-like sheet which is one step in manufacturing tires, usually, while band-like rubberized steel cords or textile cords are fed in the longitudinal direction, they are cut sequentially so as to give a parallelogram at a predetermined angle and at a predetermined width, thereafter, they are joined together in a state that their end surfaces are butted, thereby manufacturing a band-like sheet having a certain cord angle in the longitudinal direction.

Conventionally, as this type of sheet manufacturing device, a device for cutting and joining rubberized steel cords disclosed in Japanese Patent No. 2923066 (Patent Document 1) and a device for joining and positioning cords disclosed in Japanese Published Unexamined Patent Application No. Sho-62-105626 (Patent Document 2) are known. In the sheet manufacturing devices disclosed in these documents, the front end of a steel sheet piece located on the rear side (on the downstream side) is gradually brought closer to the rear end of a steel sheet piece discharged after being cut and located in the front (on the upstream side) by using conveyors, thereby joining the steel sheet piece in the front with that in the rear. Then, a joining machine is used to conduct a joining process along a joining line formed at this time, thereby providing a band-like sheet in which these rubberized steel sheet pieces in the front and in the rear thereof are integrated.

Patent Document 1: Japanese Patent No. 2923066
Patent Document 2: Japanese Published Unexamined Patent Application No. Sho-62-105626

DISCLOSURE OF THE INVENTION

Problems to be Solved by the Invention

A demand for changing the cutting width and cutting angle has been so far met by a method for dividing and connecting conveyors. In recent years, there has been a demand for cutting a band-like sheet from a raw material member extremely small in angle and narrow in width, resulting in a situation where no measures can be provided only by dividing and connecting conveyors. In other words, where a steel sheet piece on the rear side which is placed on a conveyor on the rear side enters on a joining table on the front side and comes closer to a steel sheet piece in the front, a problem arises that the conveyor on the rear side which gives conveying force to a steel cord on the rear side is gradually decreased in the supporting area, thus making it impossible to transmit the conveying force of the conveyor to the steel cord. In particular, where steel sheet pieces are smaller in angle and narrower in width, this problem is made more apparent. As a result, in order that steel sheet pieces small in angle and narrow in width are joined to give a band-like sheet, in the end, there is no other method but to resort to manual work by workers.

The present invention is to settle conventional problems, and an object of which is to provide a device and a method for manufacturing a sheet capable of conducting such work without difficulty that even for steel sheet pieces cut from a raw material member small in angle and narrow in width, the front end of a sheet piece with cords located on the rear side is butted against the rear end of a sheet piece with cords (steel sheet piece) located in the front to join them and also capable of realizing high workability to conduct the work without resorting to workers.

Means for Solving the Problem

The device for manufacturing a sheet with cords in the present invention is a device for manufacturing a sheet with cords which connects a plurality of sheet pieces with cords in which the cords are covered with a covering material in the front and in the rear thereof in the longitudinal direction, thereby manufacturing a continuous sheet, and the device is provided with a plurality of conveyor belts which are disposed, with a space kept mutually in the width direction orthogonal to the longitudinal direction thereof, and capable of running along the longitudinal direction in such a state that the sheet pieces with cords are placed thereon, and a lift mechanism which is installed between the plurality of conveyor belts to support the sheet pieces with cords on the upstream side or those on the downstream side in the longitudinal direction among the sheet pieces with cords placed on the conveyor belts while in contact with these sheet pieces from the lower side, thereby allowing them to make a relative upward movement from the sheet placing surfaces of the conveyor belts.

According to the device for manufacturing a sheet with cords in the present invention, the lift mechanism disposed between a plurality of conveyor belts is used to lift the sheet pieces with cords on the upstream side or those on the downstream side which are conveyed by the conveyor belts upward from the sheet placing surfaces of the conveyor belts and keep them stationary. With this state kept, the conveyor belts are run, thus making it possible to bring a second subsequent sheet piece with cords closer to a first preceding sheet piece with cords. Thereafter, the lift mechanism is lowered, by which the first sheet piece with cords supported by the lift mechanism can be butted against the second sheet piece with cords placed on the sheet placing surfaces of the conveyor belts to join them. Then, such work for butting these sheet pieces located in the front and in the rear thereof can be conducted automatically by driving the conveyor belts and the lift mechanism without resorting to workers. Further, even where there is a shortage of conveying force of the conveyor belts on the rear side in conveyance of sheet pieces with cords cut from a raw material member small in angle and narrow in width, the conveying force of the conveyor belts installed on the device for manufacturing a sheet in the present invention is used to guide a second sheet piece with cords into the device, thus making it possible to bring the second sheet piece with cords closer to a first sheet piece with cords supported by the lift mechanism.

In the device for manufacturing a sheet with cords in the present invention, the lift mechanism may be provided with a lifting/lowering range setting unit for setting independently at every interval between these individual conveyor belts a lifting/lowering range in the longitudinal direction which allows the sheet pieces with cords to make a relative upward movement from the sheet placing surfaces.

According to the device for manufacturing a sheet with cords in the present invention, since the lift mechanism is provided with the lifting/lowering range setting unit for setting independently at every interval between the individual conveyor belts a lifting/lowering range in the longitudinal direction which allows the sheet pieces with cords to make a relative upward movement from the sheet placing surfaces, it is possible to cope with any change in angle and width of the sheet pieces with cords easily.

In the device for manufacturing a sheet with cords in the present invention, the lifting/lowering range setting unit may be provided with a plurality of band bodies arranged between the individual conveyor belts and also so as to be along the longitudinal direction of these conveyor belts, a plurality of sheet supporting members installed on the band bodies at a partial region in the longitudinal direction to project upward from the sheet placing surfaces of the conveyor belts at a lifted position, and a position adjustment portion which allows the band bodies to move, thereby adjusting the sheet supporting members for the position in the longitudinal direction.

According to the device for manufacturing a sheet with cords in the present invention, the sheet supporting members on the band bodies are allowed to project upward from the sheet placing surfaces of the conveyor belts, thus making it possible to place highly viscous sheet pieces upward from the conveyor belts without being firmly attached to the band bodies at a partial region in the longitudinal direction along the band bodies. Further, the band bodies are driven to move sheet pieces supported by the sheet supporting members so as to be along the length direction of the band bodies, thus making it possible to adjust a joining position depending on a change in angle and width of the sheet pieces.

In the device for manufacturing a sheet with cords in the present invention, the sheet supporting members of the lift mechanism may be installed at shorter intervals in the vicinity of a joining position of sheet pieces than at other regions.

According to the device for manufacturing a sheet with cords in the present invention, the sheet supporting members of the lift mechanism are provided at shorter intervals in the vicinity of the joining position of sheet pieces than at other parts. Therefore, the sheet supporting members arranged at shorter intervals are able to keep the sheet pieces with cords horizontal more accurately and join the sheet pieces stably.

In the device for manufacturing a sheet with cords in the present invention, the lift mechanism may be provided with a plurality of lift jacks arranged between the individual conveyor belts and also so as to be along the longitudinal direction of the conveyor belts and capable of projecting upward with respect to the sheet placing surfaces of these conveyor belts, and a lift jack driving mechanism for selectively driving these plurality of lift jacks as the lifting/lowering range setting unit.

According to the device for manufacturing a sheet with cords in the present invention, the lift mechanism is provided with lift jacks arranged in plurality between the individual conveyor belts and also so as to be along the longitudinal direction of these conveyor belts and capable of projecting upward from the sheet placing surfaces of the conveyor belts, and the lift jack driving mechanism for selectively driving these lift jacks as the lifting/lowering range setting unit. Therefore, the lift jacks are selectively driven by the lift jack driving mechanism, thereby setting appropriately a lifting/lowering range which allows the sheet pieces with cords to make a relative upward movement from the sheet placing surfaces, thus making it possible to cope with any change in angle and width of the sheet pieces with cords easily.

The method for manufacturing a sheet with cords in the present invention is a method for manufacturing a sheet with cords which connects a plurality of sheet pieces with cords in which the cords are covered with a covering material in the front and in the rear thereof in the longitudinal direction, thereby manufacturing a continuous sheet, in which conveyor belts capable of running along the longitudinal direction of the sheet pieces in such a state that the sheet pieces with cords are placed thereon are disposed in plurality, with a space kept mutually in the width direction orthogonal to the longitudinal direction thereof, and a lift mechanism arranged between these plurality of conveyor belts is used to lift the sheet pieces with cords on the upstream side or those on the downstream side which are conveyed by the conveyor belts upward from the sheet placing surfaces of the conveyor belts and retain them, and, with this state kept, the conveyor belts are run, thereby a second sheet piece with cords is brought closer to a first preceding sheet piece with cords to join them.

According to the method for manufacturing a sheet with cords in the present invention, the lift mechanism arranged between a plurality of conveyor belts is used to lift the sheet pieces with cords on the upstream side or those on the downstream side which are conveyed by the conveyor belts upward from the sheet placing surfaces of the conveyor belts and keep them stationary, and, with this state kept, the conveyor belts are run, thus making it possible to bring a second subsequent sheet piece with cords closer to a first preceding sheet piece with cords. Thereafter, the lift mechanism is lowered, by which the first sheet piece with cords supported by the lift mechanism can be butted against the second sheet piece with cords placed on the sheet placing surfaces of the conveyor belts to join them. Then, such work for butting these sheet pieces located in the front and in the rear thereof can be conducted automatically by intermittent conveyance using the conveyor belts and by driving the lift mechanism without resorting to workers. Further, even where there is a shortage of conveying force of conveyor belts on the rear side in conveyance of sheet pieces with cords cut from a raw material member small in angle and narrow in width, the conveying force of the conveyor belts installed on the device for manufacturing a sheet in the present invention is used to guide a second sheet piece with cords into the device, thus making it possible to bring the second sheet piece with cords closer to a first sheet piece with cords supported by the lift mechanism and join them.

Advantageous Effects of the Invention

According to the device for manufacturing a sheet in the present invention, it is possible to improve the workability of sheet-pieces joining work by automation and also join even sheet pieces with cords cut from a raw material member small in angle and narrow in width without difficulty.

DESCRIPTION OF THE REFERENCE SYMBOLS

Figure 1:
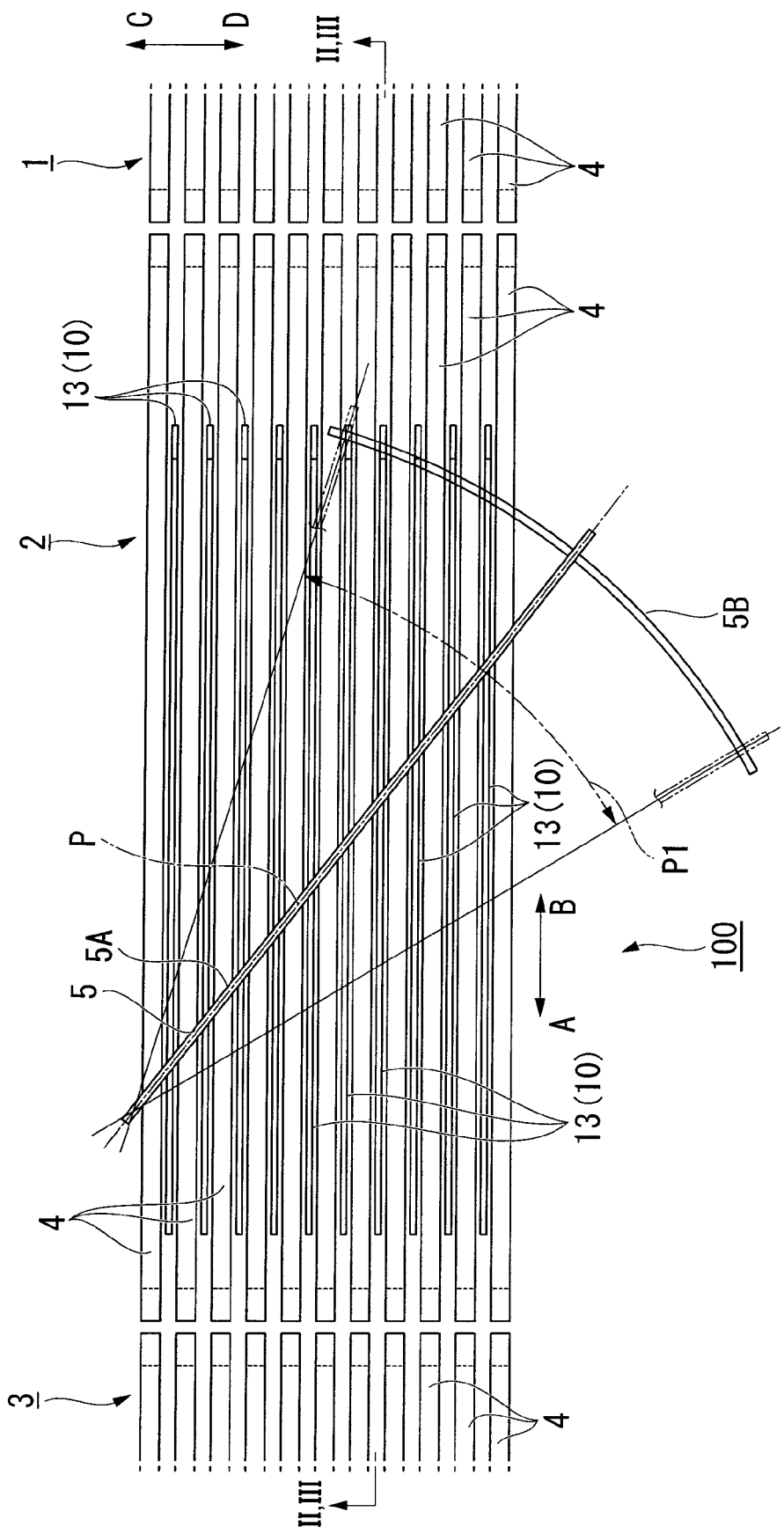
FIG. 1 is a plan view showing a device for manufacturing a sheet with cords related to a first embodiment of the present invention.

1: Carrier device
2: Carrier device
3: Carrier device
4: Conveyor belt
5: Joining device
10: Lift mechanism
13: Chain (band body) (lifting/lowering range setting unit)
16: Taper block
18: Seat
20: Sheet supporting member(lifting/lowering range setting unit)
22: Position adjustment portion (lifting/lowering range setting unit)
30: Lift mechanism
31: Lift jack
32: Lift jack driving mechanism (lifting/lowering range setting unit)
33: Sheet supporting member
34: Hydraulic circuit
35: Controller
100: Device for manufacturing a sheet with cords
101: Device for manufacturing a sheet with cords
S1, S2: Rubber sheet pieces (sheet pieces with cords)

BEST MODE FOR CARRYING OUT THE INVENTION

Hereinafter, a description will be given for the embodiments of the present invention on the basis of FIG. 1 to FIG. 8. First, with reference to FIG. 1 to FIG. 5, a description will be given for the first embodiment of the present invention. In addition, in the following embodiment, rubber sheet pieces with steel cords which are covered with rubber are joined together, and these rubber sheet pieces with the steel cords are briefly expressed as "rubber sheet pieces" when they are described.

FIG. 1 is a plan view showing a device for manufacturing a sheet with cords 100 in the present invention in which a plurality of carrier devices 1, 2, 3 are arranged serially from the upstream side (the direction indicated by an arrow B) to the downstream side (the direction indicated by an arrow A). Each of these carrier devices 1 to 3 is equipped with a plurality of narrow conveyor belts 4 for conveying rubber sheet pieces from the direction indicated by the arrow A to that indicated by the arrow B, and these plurality of narrow conveyor belts 4 are arranged mutually in parallel, with a certain space kept in the width direction (the direction indicated by bidirectional arrow C-D) orthogonal to the conveyance direction of rubber sheet pieces (the direction indicated by the bidirectional arrow A-B). Further, the carrier device 2 located at an intermediate position in the drawing is provided at an upper part with a joining device 5 for joining rubber sheet pieces in the front and in the rear thereof. Each of the conveyor belts 4 on these carrier devices 1 to 3 is supported on a main-body frame 6 and driven by a driving unit 4A. The joining device 5 goes across a plurality of conveyor belts 4 and is disposed so as to move rotationally at the center of one end. The joining device 5 is constituted with a device main body 5A for joining together rubber sheet pieces located directly below and a circular arc-like guide 5B installed at the other end of the device main body 5A. Then, the device main body 5A is allowed to move rotationally at the center of one end along the guide 5B, thus making it possible to adjust the angle of gradient with respect to the width direction of the device main body 5A (the direction indicated by the bidirectional arrow C-D) in such a manner that a joining position P can be changed within a range P1 depending on the cutting angle of the rubber sheet pieces.

Figure 2:
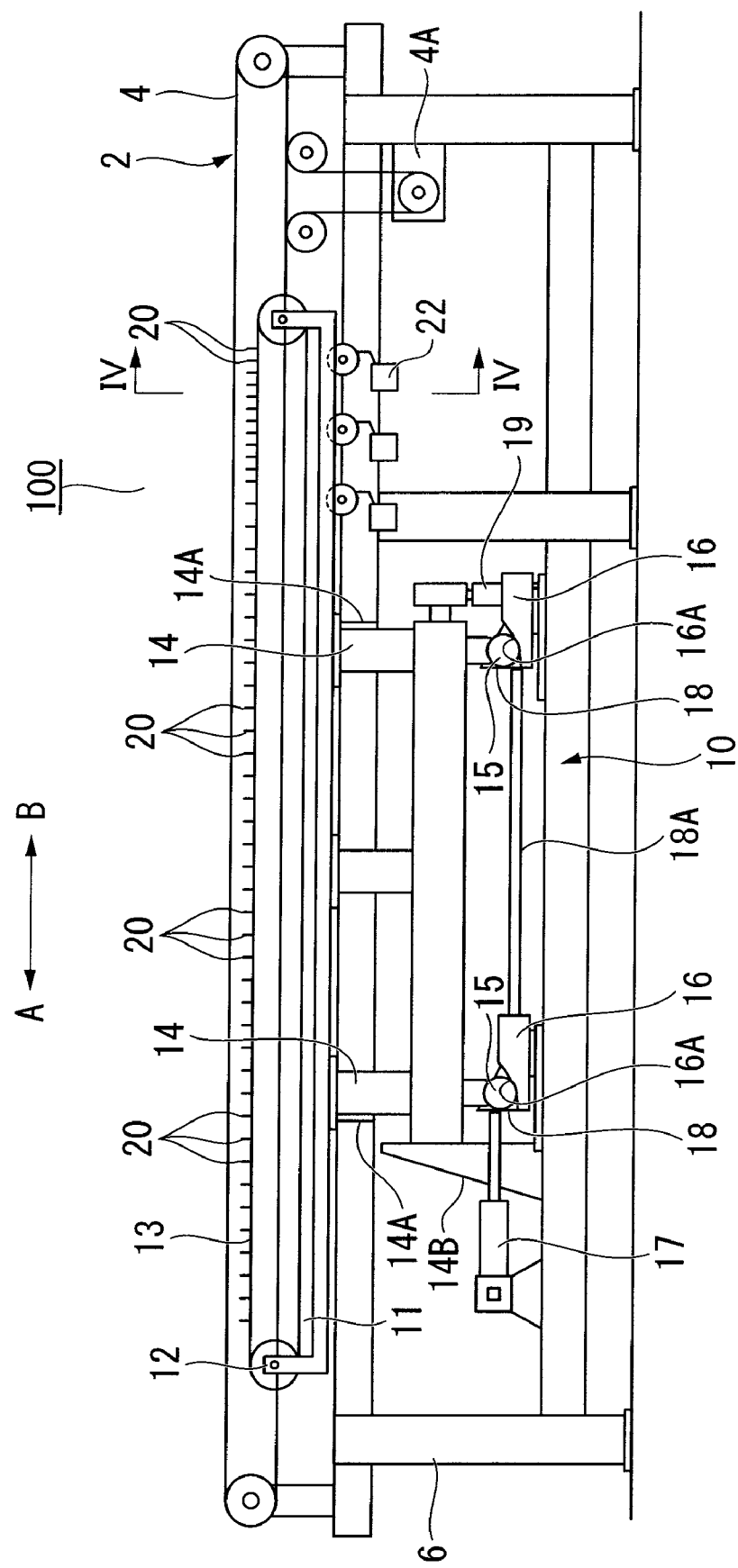
FIG. 2 is a front sectional view obtained by cutting FIG. 1 along the line II to II, showing a state where a chain 13 is at a lowered position.
Figure 3:
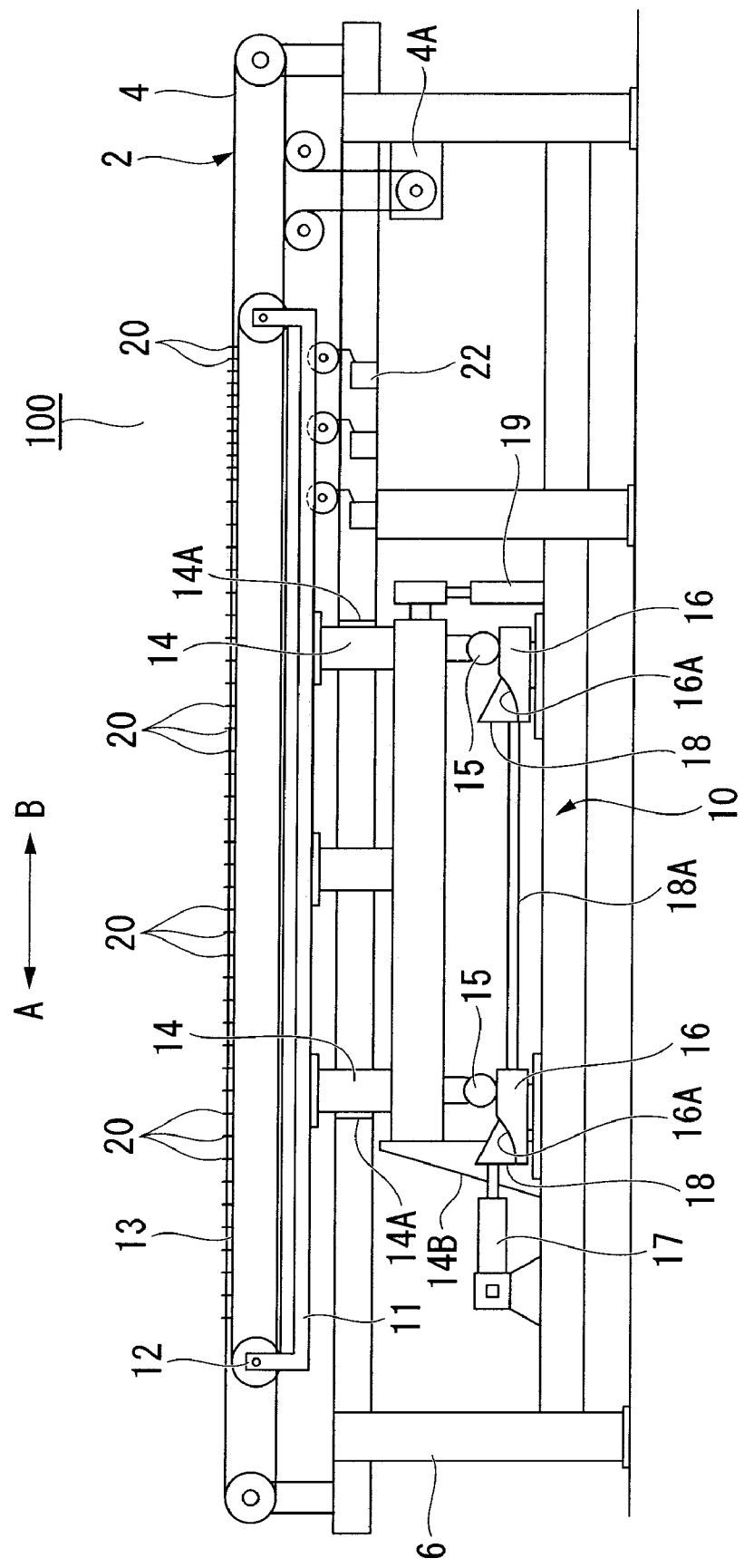
FIG. 3 is a front sectional view obtained by cutting FIG. 1 along the line III to III, showing a state where the chain 13 is at a lifted position.

A lift mechanism 10 for lifting up rubber sheet pieces conveyed by the conveyor belts 4 is installed between the conveyor belts 4 of the carrier device 2. As shown in FIG. 2 and FIG. 3, the lift mechanism 10 is provided with a chain 13 supported on a supporting frame 11 via a sprocket wheel 12, a roller 15 installed at the lower end of a leg portion 14 of the supporting frame 11, a taper block 16 for supporting the roller 15 from the lower side so as to roll freely, and a cylinder mechanism 17 for allowing the taper block 16 to move in the direction indicated by the bidirectional arrow A-B. The cylinder mechanism 17 is used to move the taper block 16 in the direction indicated by the bidirectional arrow A-B, thereby allowing the chain 13 as a whole to move up and down via the roller 15 on the taper block 16 and the supporting frame 11.

The taper block 16, the upper part of which is formed on an inclined surface 16A, is to support the roller 15 of the supporting frame leg portion 14 on the inclined surface 16A thereof. Further, a pair of the taper blocks 16 in the back and forth direction are given as one set and arranged in plurality so as to be orthogonal to the space and also installed on a common seat 18 connected by a connecting rod 18A. Then, the plurality of taper blocks 16 are moved at the same time to the direction indicated by the bidirectional arrow A-B via the seat 18 by using the common cylinder mechanism 17, thereby allowing the chain 13 as a whole to move up and down via the roller 15, the leg portion 14 and the supporting frame 11. The leg portion 14 of the supporting frame 11 is supported so as to move freely vertically by guide members 14A and 14B. Further, an urging unit 19 for urging upward is installed between the leg portion 14 and the main-body frame 6, thereby giving an assisting force on lifting the chain 13 upward.

Sheet supporting members 20 for supporting rubber sheet pieces on the conveyor belts 4 from the lower side are installed on the chain 13. These sheet supporting members 20 are installed, with a space kept, in a partial region (a central region in this example) along the conveyance direction of the rubber sheet pieces (the direction indicated by the bidirectional arrow A-B). When the sheet support members 20 are moved by the cylinder mechanism 17 over the sheet placing surfaces of the conveyor belts 4, the rubber sheet pieces are placed on the upper surfaces thereof. In addition, the sheet supporting members 20 are arranged at longer intervals on the side in the direction indicated by the arrow A, while they are arranged at shorter intervals on the side in the direction indicated by the arrow B where the joining process is performed. This is to keep the rubber sheet pieces supported by the sheet supporting members 20 horizontal more accurately at the end of the chain 13. In addition, a description is given for the case where the joining process is conducted on the side in the direction indicated by the arrow B. Where the joining process is conducted on the side in the direction indicated by the arrow A, the sheet supporting members 20 on the side in the direction indicated by the arrow A are arranged at shorter intervals. In other words, arrangement of the sheet supporting members 20 at shorter intervals may be changed appropriately, depending on the place where the joining process is conducted.

Figure 4:
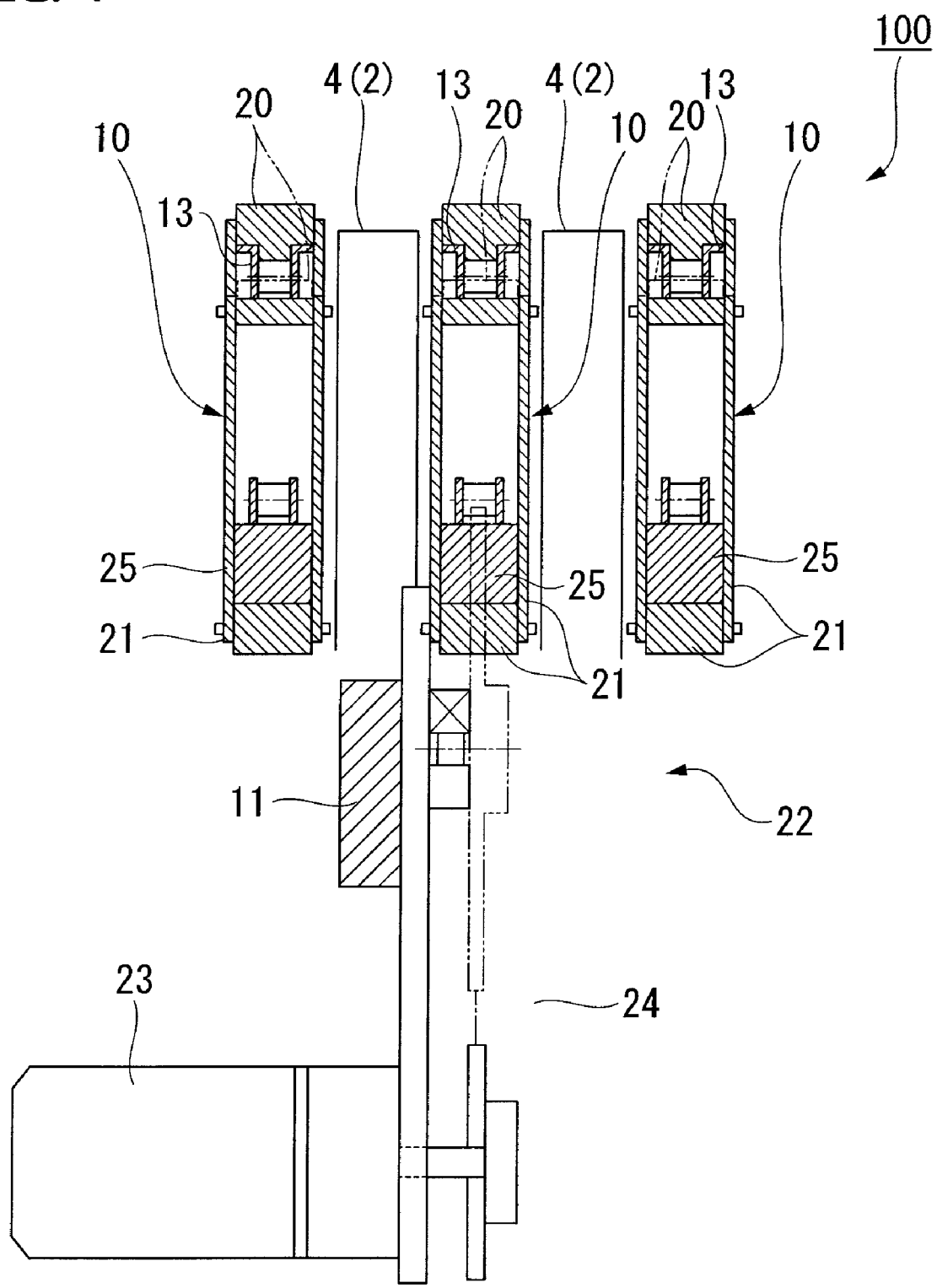
FIG. 4 is a side cross sectional view obtained by cutting FIG. 2 along the line IV to IV.

As shown in FIG. 4, the chain 13 and the sheet supporting members 20 fixed on the chain 13 are guided in the direction indicated by the bidirectional arrow A-B by a guide member 21 fixed on the supporting frame 11. Further, a position adjustment portion 22 is installed on the chain 13. The position adjustment portion 22 is constituted with a driving motor 23 and a power transmitting unit 24 for transmitting the driving force of the driving motor 23 to the chain 13 via a sprocket wheel and gears. Then, the position adjustment portion 22 adjusts a position of the sheet supporting members 20 on the chain 13 along the direction indicated by the bidirectional arrow A-B, depending on the cutting angle at the ends of rubber sheet pieces by selectively driving the driving motor 23. More specifically, depending on the joining position P of the joining device 5 and the cutting angle at the ends of rubber sheet pieces, the driving motor 23 of each of the chains 13 is selectively driven to adjust a position of the sheet supporting members 20 so that the end of a rubber sheet piece to be joined (at the right end in this example) is also positioned at the end of the sheet supporting member 20 on the chain 13 (at the right end in this example). Further, there is the case that, depending on the joining position P of the joining device 5 and the cutting angle at the ends of the rubber sheet pieces, the end of a rubber sheet piece to be joined is at the left end. In this case as well, the driving motor 23 of each of the chains 13 is selectively driven to adjust the position of the sheet supporting members 20. In addition, in FIG. 4, the numeral reference 25 indicates a spacer, which supports the chain 13 located below.

Then, in the above-described lift mechanism 10, as shown in FIG. 2, where the taper block 16 is moved by the cylinder mechanism 17 in the direction indicated by the arrow B, the chain 13 is lowered via the roller 15 on the taper block 16 and the supporting frame 11, and sheet supporting members 20 fixed on the chain 13 are kept at a lower position than the sheet placing surfaces of the conveyor belts 4 (at a lowered position). As a result, the conveyor belts 4 are driven, by which rubber sheet pieces are passed through the chain 13 in the direction indicated by the bidirectional arrow A-B without difficulty. On the other hand, as shown in FIG. 3, where the taper block 16 is moved in the direction indicated by the arrow A by the cylinder mechanism 17, the chain 13 is lifted via the roller 15 on the taper block 16 and the supporting frame 11, and the sheet supporting members 20 fixed on the chain 13 are kept projected at a higher position than the sheet placing surfaces of the conveyor belts 4 (at a lifted position). As a result, the rubber sheet pieces are not conveyed by the conveyor belts 4 in the range where the sheet supporting members 20 project, by which the rubber sheet pieces can be conveyed by the conveyor belts 4 only before and after the range thereof. In other words, in the lift mechanism 10, the lifting/lowering range setting unit for setting the range in which rubber sheet pieces are lifted or lowered is constituted with the sheet supporting members 20, the chain 13 and the position adjustment portion 32 for running the chain 13.

Figure 5:
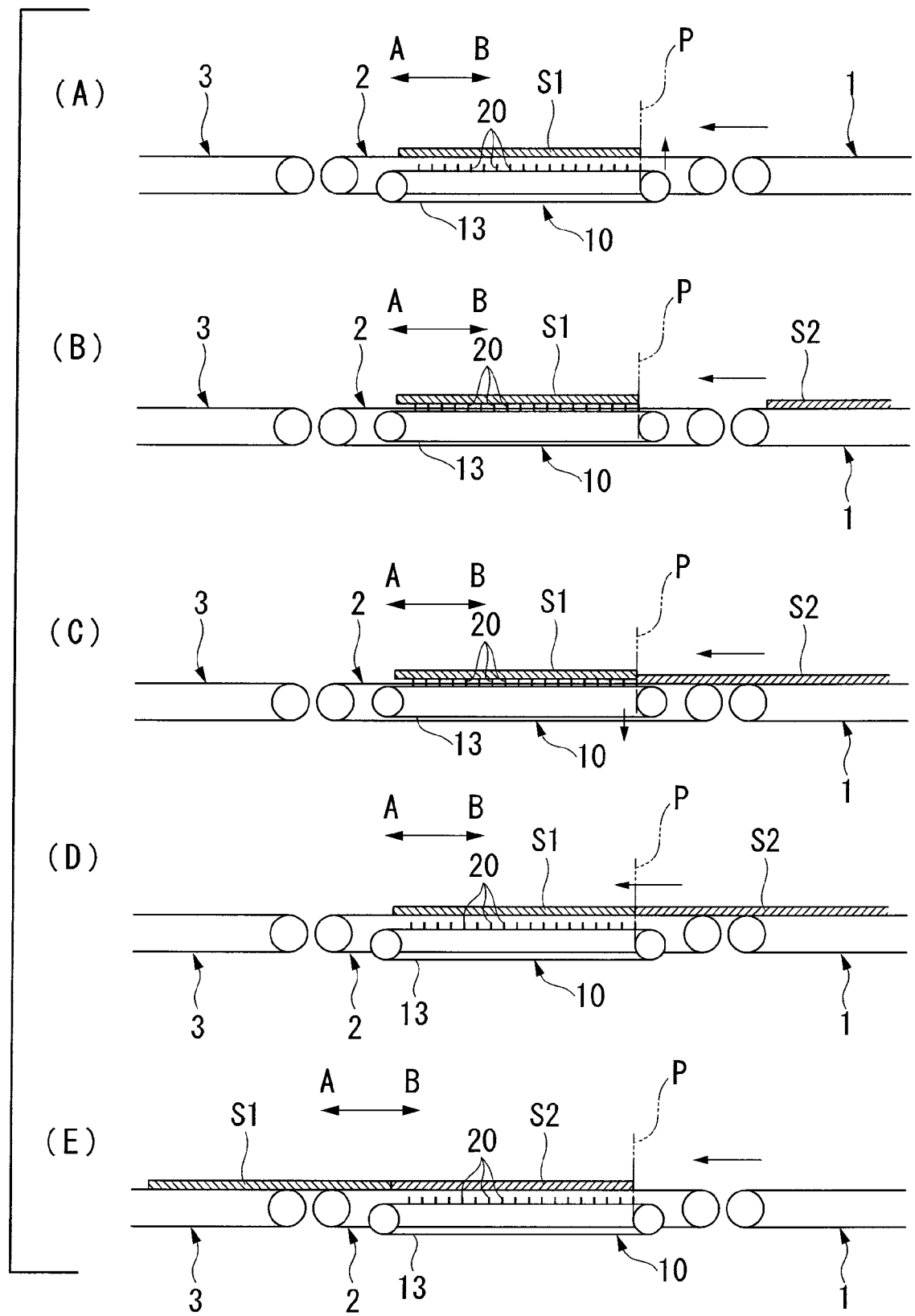
FIG. 5 is a schematic view showing a step of joining two rubber sheet pieces.

Then, in the above-constituted device for manufacturing a sheet with cords 100, rubber sheet pieces are joined in steps shown in FIG. 5.

(1) First, the conveyor belts 4 of the carrier devices 1, 2 are all together driven in the direction indicated by the arrow A, by which a rubber sheet piece after being cut and supplied via the carrier device 1 on the upstream side (this is referred to as S1) is carried until the rear end thereof is given as the joining position P on the central carrier device 2. At this time, the sheet supporting members 20 fixed on the chain 13 are kept at a lower position than the sheet placing surfaces of the conveyor belts 4. In this instance, the main body 5A of the joining device 5 is turned around to adjust the joining position P so as to correspond to the cutting angle of a rubber sheet piece to be carried. Further, adjustment is made in advance so that the sheet supporting members 20 on the chain 13 are positioned directly below the adjusted joining position P (refer to FIG. 5(A)). In other words, such adjustment is made that the chain 13 is driven by the position adjustment portion 22, thereby, as indicated in the drawing, the right end of the sheet supporting member 20 in the arrangement thereof is approximately in alignment with the joining position P.

(2) Next, the cylinder mechanism 17 installed on the carrier device 2 is driven, by which the chain 13 is lifted to keep the sheet supporting members 20 fixed to the chain 13 projected at a higher position than the sheet placing surfaces of the conveyor belts 4. Thereby, the rubber sheet piece S1 is lifted up from the sheet placing surfaces of the conveyor belts 4 (refer to FIG. 5(B)). In this instance, the right end of the sheet supporting member 20 in the arrangement thereof is in advance approximately in alignment with the joining position P, by which the rubber sheet piece S1 is kept supported reliably by the sheet supporting members 20 up to the rear end. In particular, the sheet supporting members 20 are arranged at shorter intervals in the vicinity of the joining position P, thus making it possible to keep reliably the rear end of the rubber sheet piece S1 horizontal.

(3) In the central carrier device 2, in a state where the rubber sheet piece S1 is lifted from the sheet placing surfaces of the conveyor belts 4, the conveyor belts 4 of the carrier devices 1, 2 are driven in the direction indicated by the arrow A, by which a subsequent rubber sheet piece S (this is referred to as S2) is brought closer to the preceding rubber sheet piece S1. In this instance, the preceding rubber sheet piece S1 is kept by the sheet supporting members 20 at a higher position than the sheet placing surfaces of the conveyor belts 4. Therefore, even when the conveyor belts 4 of the carrier device 2 are driven, they will not move in the direction indicated by the arrow A (refer to FIG. 5(C)).

(4) Next, the cylinder mechanism 17 is driven, by which the chain 13 is lowered to keep the sheet supporting members 20 fixed on the chain 13 at a lower position than the sheet placing surfaces of the conveyor belts 4. Thereby, the rubber sheet piece S1 on the sheet supporting member 20 is placed again on the sheet placing surfaces of the conveyor belts 4, thereby giving a state in which the rubber sheet piece S1 is butted against the subsequent rubber sheet piece S2. Thereafter, such process is conducted that the joining device 5 is used to join these two rubber sheet pieces S1, S2 (refer to FIG. 5(D)).

(5) The conveyor belts 4 of the carrier devices 2, 3 are driven all together, by which the joined rubber sheet pieces S1, S2 are moved in the direction indicated by the arrow A. Thereby, the rear end of the joined rubber sheet piece S (the rear end of the rubber sheet piece S2) is positioned at the joining position P (refer to FIG. 5 (E)). Further, since there is usually no chance that rubber sheet pieces are changed in cutting angle in mid-process, the position of the sheet supporting members 20 may be the same as that set at the previous joining process. In addition, where any change in cutting angle is found, the sheet supporting members 20 may be changed in the position by the position adjustment portion 32 on a timely basis. Then, work procedures of (1) to (5) are repeated, thus making it possible to manufacture a band-like sheet in which many rubber sheet pieces S are continuously joined.

As so far described in detail, according to the device for manufacturing a sheet with cords 100 in the present embodiment, as apparent from the above-described work procedures of (1) to (5), work for butting the rubber sheet pieces S1, S2 in the front and in the rear thereof can be performed automatically by driving the conveyor belts 4 of the carrier devices 1 to 3 and by driving the lift mechanism 10 without resorting to workers. Further, even where there is a shortage of conveying force of the conveyor belts 4 of the carrier device 1 on the rear side in conveyance of the rubber sheet pieces S1, S2 small in angle and narrow in width, the conveying force of the conveyor belts 4 of the central carrier device 2 is used to guide the subsequent rubber sheet piece S2 into the carrier device 2, thus making it possible to bring the rubber sheet piece S2 closer to the preceding rubber sheet piece S1 supported on the lift mechanism 10 and butt them. In other words, in the sheet manufacturing device 100, such advantages that sheet pieces joining work can be improved in workability by automation and rubber sheet pieces S cut from a raw material member small in angle and narrow in width can be joined are provided without difficulty.

Further, according to the device for manufacturing a sheet with cords 100, the sheet supporting members 20 on the chain 13 are allowed to project upward from the sheet placing surfaces of the conveyor belts 4 at a lifted position of the chain 13. Therefore, highly viscous sheet pieces can be positioned upward from the conveyor belts 4 by the sheet supporting members 20, without being firmly attached to the chain 13.

Still further, according to the device for manufacturing a sheet with cords 100, the sheet supporting members 20 of the lift mechanism 10 are arranged at shorter intervals at a position where sheet pieces are joined than at other regions. Therefore, the sheet supporting members 20 are arranged at such shorter intervals to keep the rubber sheet piece S1 horizontal more accurately, thus making it possible to hold sheet pieces stably.

In addition, in the above-described embodiment, the lift mechanism 10 is used to lift and lower the chain 13 with respect to the sheet carrying surfaces of the conveyor belts 4. However, the present invention is not limited thereto but may be modified in such a manner that the conveyor belts 4 may be lifted or lowered with respect to the chain 13, thereby delivering rubber sheet pieces to the sheet supporting members 20 on the chain 13. Further, in this embodiment, the chain 13 is used as a band body, however, the present invention shall not be limited thereto, and a belt may be used.

Still further, there are three career devices in the above embodiment. However, such a constitution is also acceptable where a larger number of carrier devices are arranged. Alternatively, for example, the carrier devices 1, 2 may be combined into a single carrier device.

Figure 6:
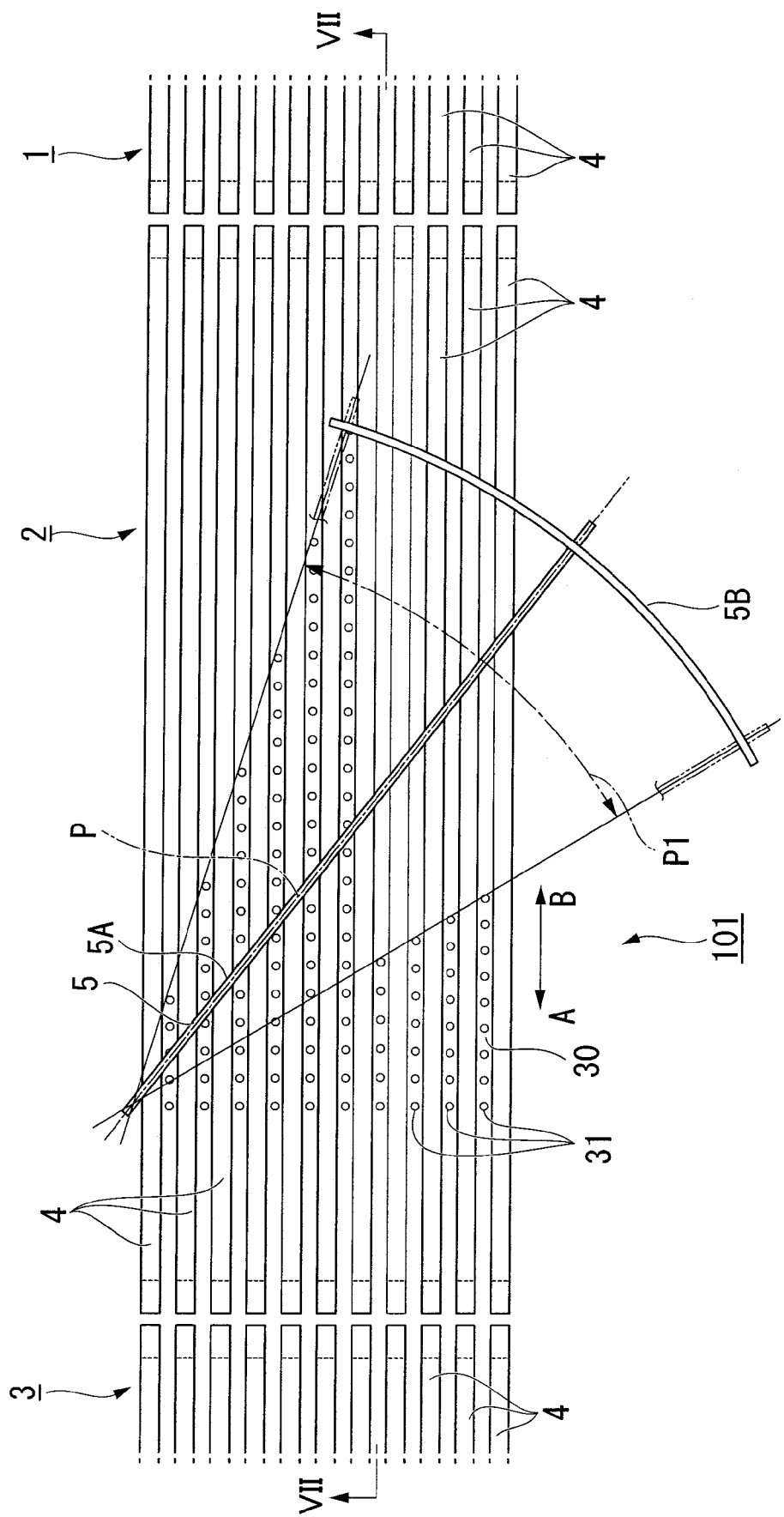
FIG. 6 is a plan view showing a device for manufacturing a sheet with cords related to a second embodiment of the present invention.
Figure 7:
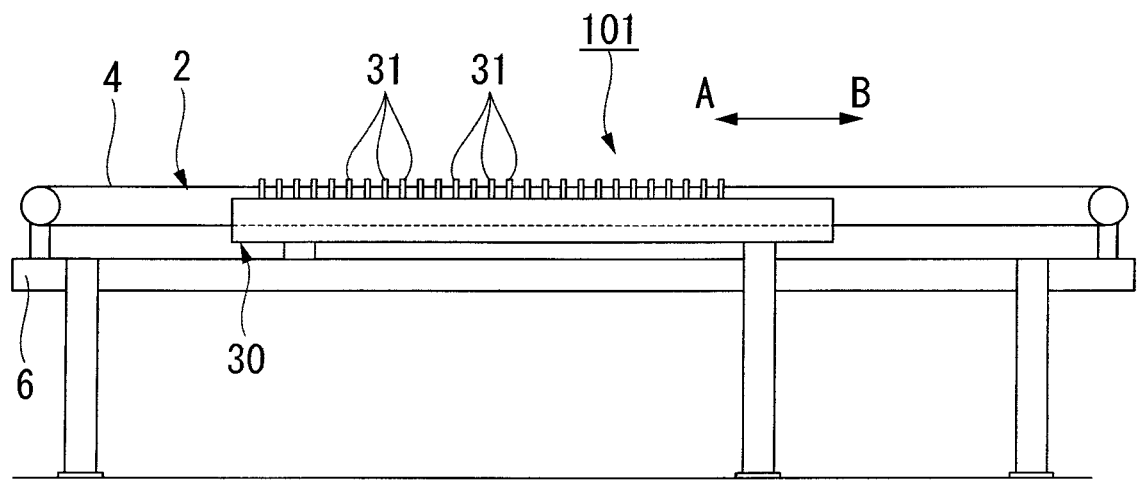
FIG. 7 is a front sectional view obtained by cutting FIG. 6 along the line VII to VII, showing a state where a lift jack 31 is at a lifted position.
Figure 8:
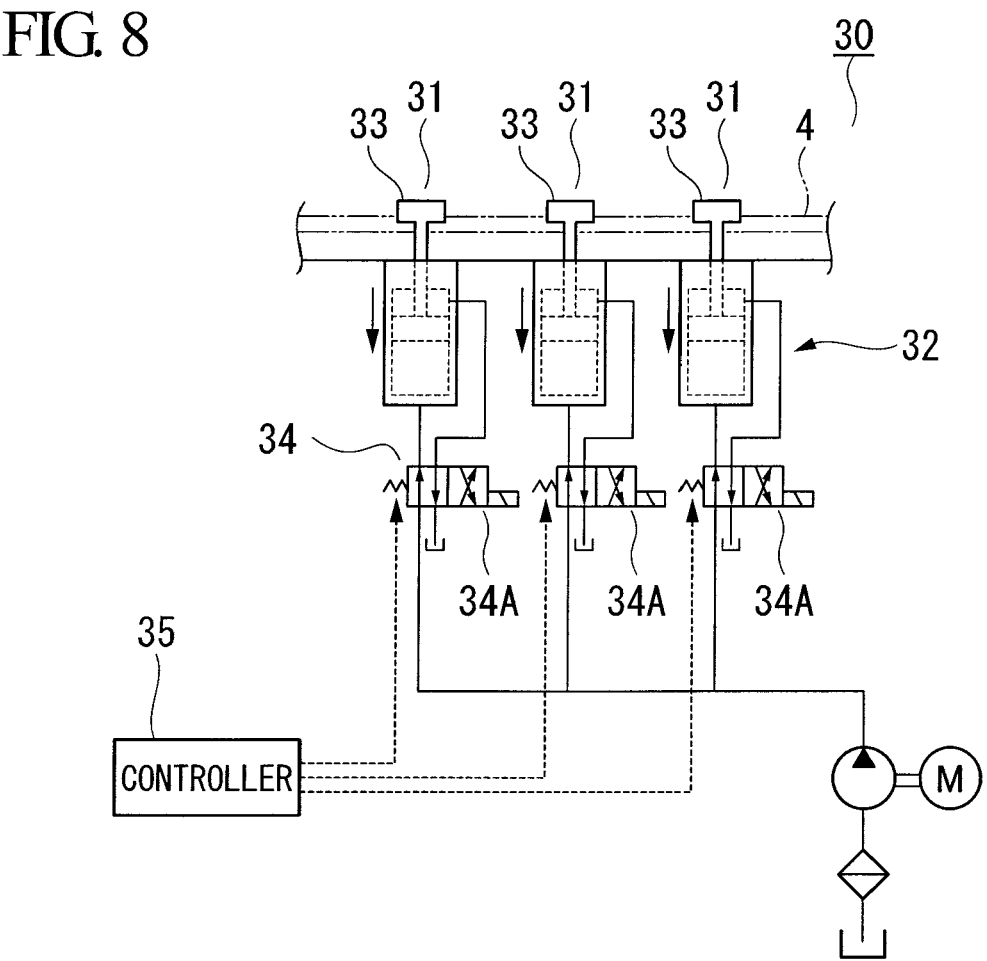
FIG. 8 is a schematic view showing a lift mechanism 30.

With reference to FIG. 6 to FIG. 8, a description will be given for a second embodiment of the present invention. A device for manufacturing a sheet with cords 101 in the second embodiment is different from the device for manufacturing a sheet with cords 100 in the first embodiment in the constitution of the lift mechanism. That is, a lift mechanism 30 of the present embodiment does not use a chain capable of lifting and lowering freely but, as shown in FIG. 6, is provided with a plurality of lift jacks 31 in a partial region (a central part in the present embodiment) between conveyor belts 4 along the longitudinal direction and a lift jack driving mechanism 32 for selectively driving these lift jacks 31.

The lift jacks 31 are able to project upward with respect to the sheet placing surfaces of the conveyor belts 4. And, when the lift jacks 31 are at a lifted position as shown in FIG. 7 and FIG. 8, rubber sheet pieces on the conveyor belts 4 are lifted by sheet supporting members 33 at the leading ends of the piston rods thereof. Further, where the lift jacks 31 are lowered to a lowered position below the sheet placing surfaces of the conveyor belts 4, the rubber sheet pieces S are conveyed by the conveyor belts 4 in the direction indicated by the bidirectional arrow A-B without difficulty. The present embodiment is the same as the first embodiment in this respect. As shown in FIG. 6, arrangement of the lift jacks 31 may be made freely in accordance with a shape at the ends of rubber sheet pieces formed in a parallelogram as a whole. Further, hydraulic, air and electromagnetic lift jacks are usable as the lift jacks 31.

The lift jack driving mechanism 32 is constituted with a hydraulic circuit 34 for selectively driving the lift jacks 31 and a controller 35 for switching an electromagnetic valve 34A installed on the hydraulic circuit 34. The electromagnetic valve 34A inside the hydraulic circuit 34 is selectively switched by the controller 35, thereby setting appropriately, a lifting/lowering range of the lift jack 31 for lifting sheet pieces as a lifting/lowering range setting unit. In addition, the lift jack 31 is used in the second embodiment in place of the chain 13 used in the first embodiment, and the lifting/lowering range thereof is set on the basis of the same concept. Further, basic work procedures of joining rubber sheet pieces in the second embodiment are similar to the work procedures of (1) to (5) shown previously, the explanation of which will be omitted here.

According to the above-constituted device for manufacturing a sheet with cords 101, the lift mechanism 30 is constituted with the lift jacks 31 arranged in plurality between the individual conveyor belts 4 and also so as to be along the longitudinal direction of the conveyor belts 4 and capable of projecting upward with respect to the sheet placing surfaces of the conveyor belts 4, and the lift jack driving mechanisms 32 for selectively driving the plurality of lift jacks 31. Therefore, the lift jacks 31 are selectively driven by the lift jack driving mechanisms 32, thus making it possible to set appropriately a lifting/lowering range which allows rubber sheet pieces to make a relative upward movement from the sheet placing surfaces of the conveyor belts 4. It is also possible to cope with any change in angle and width of the rubber sheet pieces easily. Further, even where there is a shortage of conveying force of the conveyor belts 4 of the carrier device 1 on the rear side in conveyance of rubber sheet pieces small in angle and narrow in width, the conveying force of the conveyor belts 4 of the central carrier device 2 is used to guide a subsequent rubber sheet piece into the carrier device 2, by which the subsequent rubber sheet piece can be brought closer and butted against a preceding rubber sheet piece supported by the lift mechanism 30. In other words, in the sheet manufacturing device 101 of the present embodiment, as with the first embodiment, there are provided such advantages that sheet pieces joining work can be improved in workability by automation and rubber sheet pieces cut from a raw material member small in angle and narrow in width can be joined without difficulty.

INDUSTRIAL APPLICABILITY

The present invention is a device for manufacturing a sheet with cords which connects a plurality of sheet pieces with cords in which the cords are covered with a covering material in the front and in the rear thereof in the longitudinal direction, thereby manufacturing a continuous sheet, and the device is provided with a plurality of conveyor belts which are disposed, with a space kept mutually in the width direction orthogonal to the longitudinal direction thereof, and capable of running along the longitudinal direction in such a state that the sheet pieces with cords are placed thereon, and a lift mechanism which is provided between the plurality of conveyor belts to support the sheet pieces with cords on the upstream side or those on the downstream side in the longitudinal direction among sheet pieces with cords placed on the conveyor belts while in contact with these sheet pieces from the lower side, thereby allowing them to make a relative upward movement from the sheet surfaces of the conveyor belts.

According to the device for manufacturing a sheet with cords in the present invention, it is possible to improve the workability of sheet pieces joining work by automation and also join even sheet pieces with cords cut from a raw material member small in angle and narrow in width without difficulty.

The invention claimed is:

1. A device for connecting a plurality of sheet pieces in a longitudinal direction to form a continuous sheet, each of the sheet pieces having cords covered by rubber, the device for connecting the plurality of sheet pieces comprising:
   a plurality of conveyor belts disposed with a space kept mutually in a width direction orthogonal to the longitudinal direction, and capable of running along the longitudinal direction thereof in such a state that the sheet pieces with cords are placed thereon; and
   a lift mechanism installed between the plurality of conveyor belts and configured to lift and support at least one of an upstream longitudinal end or a downstream longitudinal end of the sheet pieces placed on the conveyor belts;
   a lifting/lowering range setting unit including a plurality of band bodies arranged between the individual conveyor belts and along the longitudinal direction of the conveyor belts;
   a plurality of sheet supporting members installed partially along the band bodies in the longitudinal direction to project upward from the sheet placing surfaces of the conveyor belts when the band bodies are at a lifted position; and
   a position adjustment portion which allows the band bodies to move in the longitudinal direction to adjust a position of the plurality of sheet supporting members;
   wherein
   the lift mechanism is provided with the lifting/lowering range setting unit for independently setting a horizontal length along which the lifting mechanism provides a lifting action in each of the spaces between parallel conveyor belts, and
   the sheet supporting members of the lift mechanism are installed at shorter intervals in a vicinity of a joining position of the sheet pieces than at other parts.

* * * * *